Jan. 22, 1963 W. M. WALLACE 3,074,633
SIGNAL
Filed July 21, 1961 2 Sheets-Sheet 1
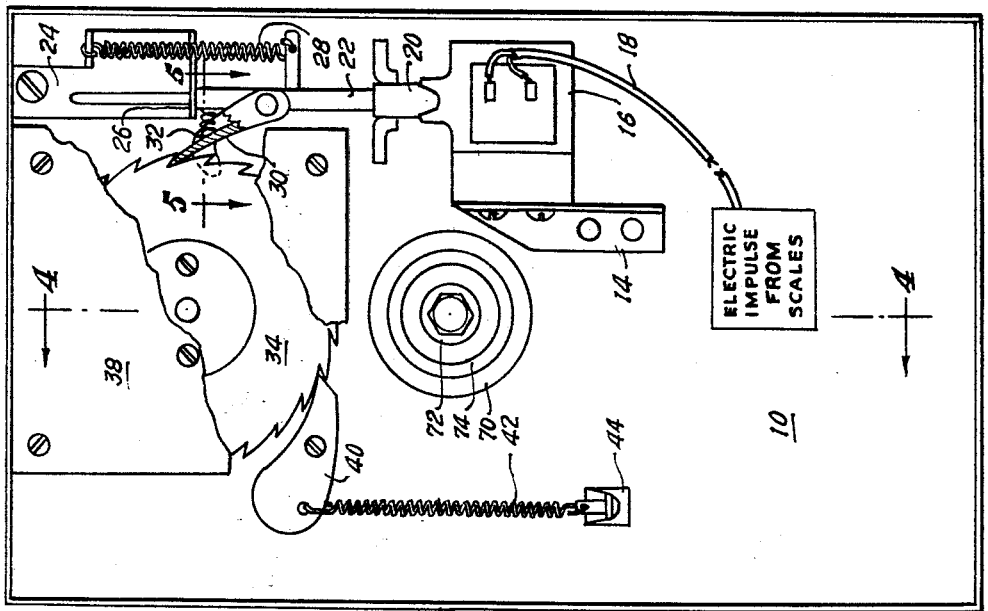
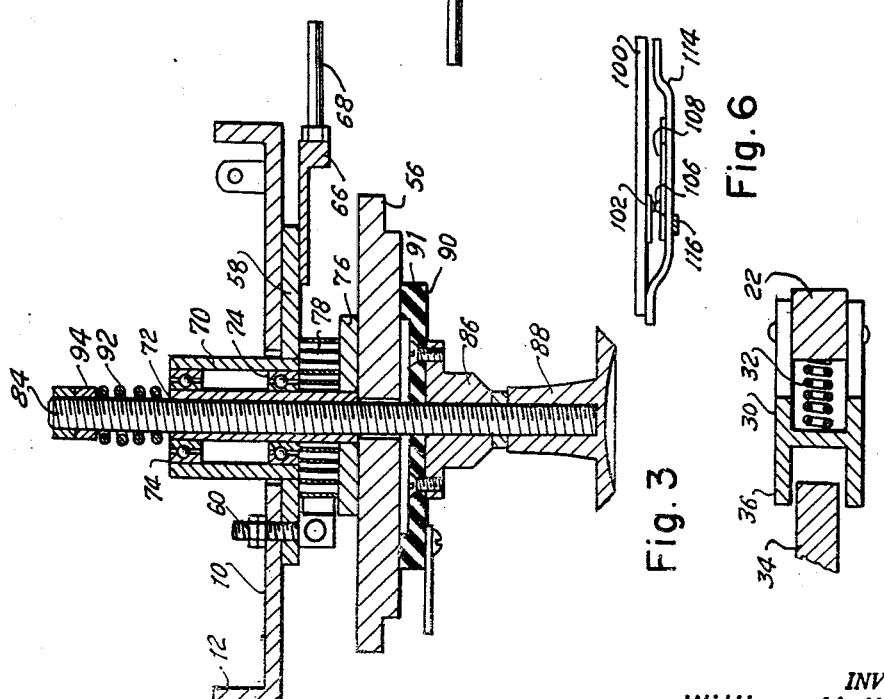
Fig. 1
Fig. 3
Fig. 5
Fig. 6
*INVENTOR.*
William M. Wallace
BY
*ATTORNEY*

Jan. 22, 1963 W. M. WALLACE 3,074,633
SIGNAL
Filed July 21, 1961 2 Sheets-Sheet 2

INVENTOR.
William M. Wallace
BY *C.W.Coffee*
ATTORNEY

3,074,633
SIGNAL
William M. Wallace, P.O. Box 1301, Lubbock, Tex.
Filed July 21, 1961, Ser. No. 125,791
2 Claims. (Cl. 235—132)

This invention relates to signals and more particularly to an apparatus for lighting a signal light in response to a certain weight of seed.

In cotton gins, often the seed cotton arrives at the gin in trailers with three or four bales on the trailer. It is then necessary for the operators of the gin to divide the total cotton into the several bales. This is generally accomplished by weighing the cotton seed as ginned. Usually there is an established ratio between the weight of the seed and the weight of the lint cotton. Therefore, after a certain weight of seed has been ginned, the cotton lint press is turned and a bale of lint cotton produced. Normally about 720 pounds of cotton seed result in a 500 pound bale of lint cotton although this ratio varies with type of cotton, etc.

It is desirable to have a visual indication which may be seen at some distance from the recording mechanism so that the ginner may know that a bale of cotton is ready to be divided from the entire load.

According to more recent developments in seed weighing equipment the seed is generally weighed in ten pound batches. I.e., an automatic dumping scale is provided so that when ten pounds of cotton seed have been passed into a hopper it dumps and a mechanism on the seed scale sends an electrical impulse to a recording mechanism to indicate that the ten pounds of seed have passed the seed scales.

Therefore, an electrical impulse is available as information from the seed scale indicating that ten pounds of cotton seed have passed the scales.

An object of this invention is to provide an indication to a cotton gin operator when a preset amount of seed has been ginned.

Another object of this invention is to provide that electrical signal when a certain number of impulse signals has been counted.

Another object is to provide a device for counting impulse signals and giving an electrical responsive signal at the time an adjustable preset number of impulse signals has been counted.

A further object is to provide a device wherein the number of impulse signals necessary to actuate the output signal is easily changed by the operator.

A further object is to provide a device which is readily reset to zero when the number of signals has been received.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a back elevation of a device according to this invention without the cover with some parts shown schematically and other parts broken away for clarity.

FIG. 3 is a sectional view taken on line 3—3 of FIG. 2, the solenoid has not been shown for the sake of clarity.

FIG. 5 is a partial sectional view showing a portion of the device taken on line 5—5 of FIG. 1.

FIG. 6 is a partial sectional view of the switch taken on line 6—6 of FIG. 4, with some parts omitted for clarity.

Figure 2:
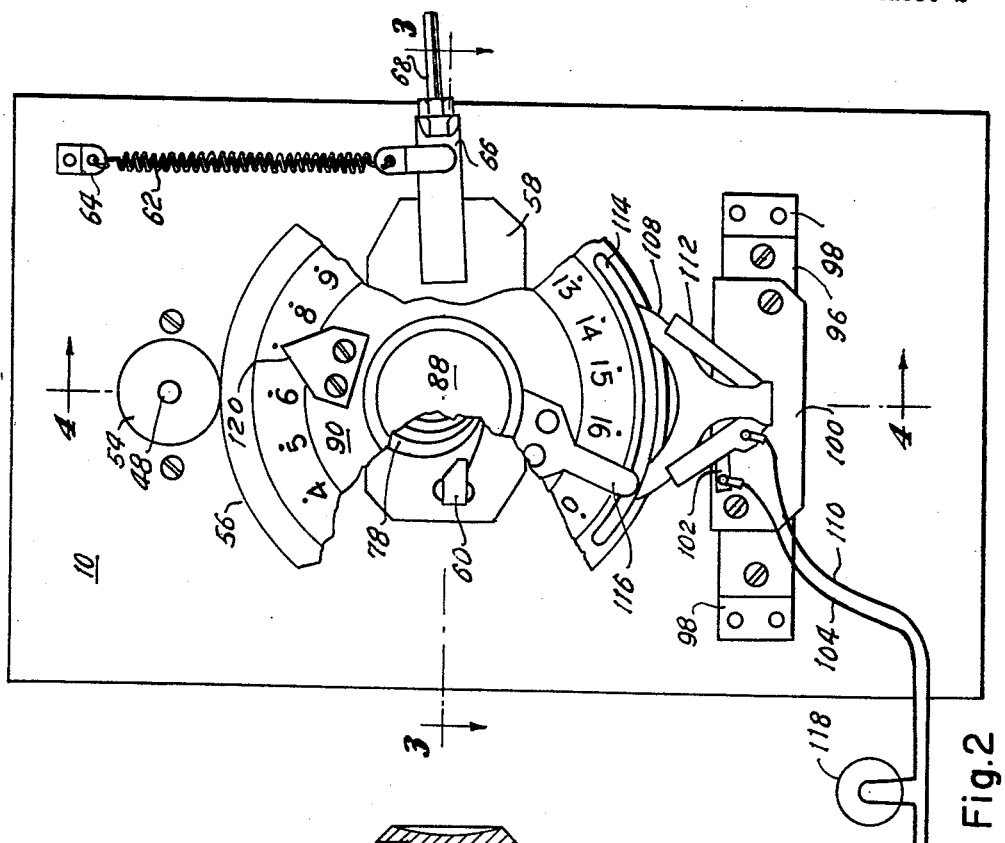
FIG. 2 is a front elevation of a device according to this invention without the cover with some parts shown schematically and other parts broken away for clarity.

As may be seen in the drawings the apparatus is structurally mounted upon mounting plate 10. The mounting plate 10 is light gauge sheet metal with flanges 12 at all four sides. The metal has been shown in the drawing thicker than would be used in actual practice for the purpose of clarity in the drawings.

Bracket 14 (FIG. 1) is attached to the back of the mounting plate 10 by brads or any other convenient conventional manner. Solenoid 16 receives by a pair of electrical wires 18 an electrical impulse from the seed scales. Each time the impulse is received it moves plunger 20 downward. Rod 22 is connected to the plunger 20 so that it moves downward therewith. Bracket 24 is attached by a screw or any other convenient manner to the mounting plate 10 and has an upturned flange 26 with a hole therethrough. The rod 22 passes through the hole and therefore the flange 26 acts as a guide for rod 22. The rod has a shoulder which in FIG. 1 is shown against the lower edge of the flange 26 and which acts to limit the upward travel of the rod. Spring 28 is connected between a lug on bracket 24 and a projection on rod 22 biasing the rod upward. When the solenoid 16 is not energized the rod 22 is urged in the upward position by the spring 28.

Pawl 30 is pivoted to the rod 22 by a bolt extending through the pawl and rod. Spring 32 biases the pawl toward ratchet wheel 34. The pawl is guided by ears 36 on either side of the rachet wheel 34. The ratchet wheel 34 is mounted for rotation between the mounting plate 10 and ratchet plate 38 as will be described in detail later. Dog 40 is pivoted to the mounting plate 10 and with the point of the dog biased toward the ratchet wheel 34 by spring 42 which extends from lug 44 on mounting plate 10. Each time an electrical impulse is received by wires 18, the rod 22 and pawl 30 are moved downward so that the pawl is pushed under another tooth of the ratchet wheel 34 by spring 32. The ratchet wheel is prevented from rotating backwards at this time by the dog 40 engaged behind a tooth. When the electrical impulse ceases, the spring 28 moves the rod 22 and the pawl 30 upward advancing the ratchet wheel 34 one tooth. The ultimate consequence of this is that each electrical impulse from the scale will rotate the ratchet wheel one increment.

Figure 4:
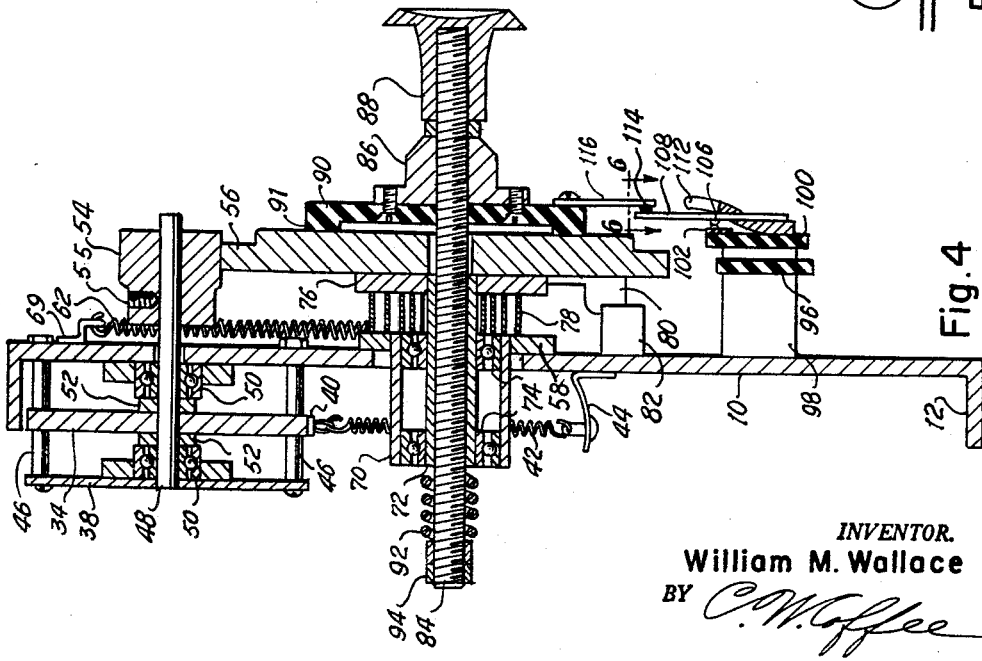
FIG. 4 is a sectional view of the device taken on line 4—4 of FIG. 1 and FIG. 2.

The ratchet plate 38 is held in parallel relationship to the mounting plate 10 by a plurality of posts 46 (FIG. 4). Shaft 48 extends through a hole in the mounting plate 10 and is journaled to the mounting plate and ratchet plate 38 by bearings 50. The ratchet wheel 34 is securely attached to the shaft and is spaced in proper relationship by the spacers 52 between the ratchet wheel 34 and the bearings 50. Friction wheel 54 is on the end of the shaft 48 protruding on the front side of the mounting plate 10. It is attached by set screw 55. In normal operation it bears against disc 56. Bearing plate 58 is pivoted to mounting plate 10 by bolt 60 which extends through the bearing plate 58 and mounting plate 10. Spring 62 biases the bearing plate 58 as it is connected between lug 64 attached to the mounting plate 10 and handle 66 attached to the bearing plate 58. The handle extends past the side of the mounting plate 10 so that it is accessible from the outside of the cover. (The handle is a composite member including rod 68 which is attached to the element bearing the numeral 66 in the drawing.)

Bearing carrier 70 is attached to the bearing plate 58 and extends through a hole which is larger than the carrier in the mounting plate 10 to the rear thereof. The bearing carrier 70 has tube 72 journaled therein by means of bearings 74. The disc 56 is securely attached to the tube 72 by means of intermediate mounting plate 76. Spiral spring 78 is connected to the tube 72 and the bolt 60 so that it tends to rotate the disc 56 in a clockwise direction as seen in FIG. 2. The friction wheel 54 rotates the disc 56 in a counter-clockwise direction as seen in FIG. 2. Stop 80 mounted on the back side of the disc 56 cooperates with lug 82 attached to the mounting plate 10 to limit the rotation of the disc 56 as rotated by the spring 78.

Each electrical impulse from the scales will cause a counter-clockwise increment rotation of the disc 56. However, if the lever 68 is actuated downward, the disc 56 is disengaged from the friction wheel 54 and the spring 78 will rotate it back to a zero position, i.e., until the stop 80 strikes the lug 82.

Threaded shaft 84 is journaled for rotation within the tube 72. Mounting nut 86 and knob 88 are screwed on the threaded shaft and jammed against one another (through a washer) until they are securely fastened to the threaded shaft 84. Pointer disc 90 is attached to the mounting nut 86 by screws which extend through the pointer disc 90 into radial flanges of the mounting nut 86. The pointer disc 90 has lip 91 which extends toward the concentric disc 56 to provide frictional engagement.

The pointer disc 90 is held firmly against the disc 56 by spring 92 which is compressed between nuts 94 and the back of tube 72. Normally the pointer disc 90 rotates with the disc 56; however, by pulling the knob 88 forward the pointer disc 90 may be rotated relative to the disc 56.

Intermediate switch plate 96 is attached to the front of the mounting plate 10, by brackets 98. Switch plate 100 is attached to intermediate switch plate 96. The switch plate 100 and intermediate switch plate 96 are made of insulating material. They are located adjacent and below the disc 56. Electrical contact 102 is connected to electrical wire 104. The electrical contact 102 is physically attached to the switch plate 100 in cooperative relationship to electrical contact 106, which is mounted on flexible member 108 which is itself electrically connected to wire 110 by U-shaped travel limiter 112.

The flexible member 108 is somewhat Y-shaped and is connected to the bottom both electrically and physically to the limiter 112. The top ends of the Y are connected by wire guide 114. The wire guide is such that if switch actuator 116 attached to pointer disc 90 rotates by, it presses the guide rearwardly which likewise presses the flexible member 108 rearward and presses electrical contact 106 against electrical contact 102. Thereby it connects electrical wire 104 to 110.

When the wire 104 is connected to 110 this will energize electrical lamp 118 which is connected in the circuit with a source of electrical energy. The lamp 118 is physically located within the gin plant whereby it may be seen from any convenient location. When the switch actuator 116 presses against guide 114, this will cause the desired visual signal.

It will be understood that the flexible member 108 is normally forward of the position as seen in FIG. 4 so that the electrical contacts 102 and 106 are open thereby having an open circuit.

The switch actuator 116 is attached by means of screws or otherwise to pointer disc 90. Pointer 120 is also attached by means of screws or otherwise to pointer disc 90. The pointer 120 cooperates with indices printed upon the forward face of disc 56 so that the position at which the switch actuator 116 actuates the lamp 118 is indicated. I.e., if the pointer 120 is set at the indice 7 as seen in FIG. 2 (representing 700 pounds) there will be 70 electrical impulses from the time disc 56 was reset to zero by the stop 80 until the switch actuator 116 depresses the flexible member 108 and thus turning on the lamp 118. The number of impulses (pounds of seed) may readily be set to any desired amount by pulling the knob 88 forward and rotating the pointer disc 90 until the pointer 120 indicates the number desired.

Thus it may be seen that I have provided a simple and effective device to actuate a visual signal at a time as adjusted when a predetermined amount of seed have been ginned.

It will be apparent that the embodiment shown is only exemplary and that various modifications can be made in construction, materials, and arrangement within the scope of the invention as defined in the appended claims.

I claim as my invention:

1. An apparatus for indicating the number of electrical impulses which have been received comprising:
    (a) a mounting plate,
    (b) a friction wheel mounted for rotation on the mounting plate,
    (c) means for rotating the friction wheel responsive to receipt of electrical impulses by the apparatus,
    (d) a bearing plate rotatably attached to the mounting plate about an axis parallel to the axis of the friction wheel,
    (e) a disc mounted for rotation relative to said bearing plate about an axis parallel to the axis of the friction wheel,
    (f) a spring interconnecting the disc and bearing plate for biasing the disc to rotate in a certain direction, and
    (g) a spring between the mounting plate and bearing plate for biasing the disc against the friction wheel.

2. An apparatus for indicating the number of electrical impulses which have been received and for signaling when a preset number have been received comprising:
    (a) a mounting plate,
    (b) a solenoid mounted on the back of the mounting plate,
    (c) a rotatable shaft extending through the mounting plate,
    (d) a ratchet wheel on the shaft on the back side of the mounting plate,
    (e) means interconnecting the solenoid and the ratchet wheel for rotating the ratchet wheel responsive to the receipt of the solenoid of an electrical impulse,
    (f) a friction wheel on the shaft on the front side of the mounting plate,
    (g) a bearing plate mounted on the front of the mounting plate for rotation about an axis parallel to the shaft,
    (h) a tube rotatably mounted on the bearing plate about an axis parallel to the shaft,
    (i) a friction disc on the tube,
    (j) a spring interconnecting the bearing plate and mounting plate for biasing the friction disc against the friction wheel,
    (k) a spring interconnecting the friction disc and bearing plate for biasing the friction disc to rotate in a certain direction,
    (l) a stop on the friction disc,
    (m) a lug on the mounting plate to contact the stop and thus limit the rotation of the friction disc,
    (n) a threaded shaft extending through the tube,
    (o) a pointer disc in front of the friction disc on the threaded shaft,
    (p) a spring between the threaded shaft and tube for biasing the pointer disc against the friction disc, (q) electrical contacts mounted on the front of the mounting plate, and
(r) means responsive to the rotational position of the pointer disc for closing the contacts; whereby the rotated position of the friction disc from the position of contact of the stop and lug indicates the number of electrical impulses received and the closing of the contacts activates a signal when a preset number has been received.

References Cited in the file of this patent

UNITED STATES PATENTS

| | | |
|---|---|---|
| 2,087,860 | Nichols | July 20, 1937 |
| 2,488,754 | Willson | Nov. 22, 1949 |
| 2,542,995 | Colt | Feb. 27, 1951 |

FOREIGN PATENTS

| | | |
|---|---|---|
| 194,627 | Austria | Jan. 10, 1958 |
| 558,627 | Great Britain | Jan. 28, 1944 |